United States Patent [19]

Keefe

[11] 4,445,277

[45] May 1, 1984

[54] UNIVERSAL PROGRAMMABLE LOCK INSTALLATION DEVICE

[76] Inventor: John Keefe, 1324 Parkside Ave., Trenton, N.J. 08638

[21] Appl. No.: 437,593

[22] Filed: Oct. 29, 1982

[51] Int. Cl.³ .................... B27G 17/08; B23B 41/00
[52] U.S. Cl. ................................ 33/197; 33/174 G; 144/144.5 R; 408/115 R
[58] Field of Search ............... 408/97, 108, 109, 114, 408/115; 33/197, 174 G; 144/144.5 R, 144.5 GT, 144 R

[56] References Cited

U.S. PATENT DOCUMENTS

| | | |
|---|---|---|
| 992,500 | 5/1911 | Harvie . |
| 1,432,485 | 10/1922 | Moller . |
| 1,919,900 | 7/1933 | Moller . |
| 2,268,930 | 1/1942 | Edwards . |
| 2,679,174 | 5/1954 | Schlage . |
| 2,679,771 | 6/1954 | Schlage . |
| 2,814,219 | 11/1957 | Zean . |
| 3,021,734 | 2/1962 | Schlage . |
| 3,212,366 | 10/1965 | Russell et al. . |
| 3,392,607 | 7/1968 | Gieseke . |
| 3,635,571 | 1/1972 | Roberts et al. ............ 408/97 |
| 4,306,823 | 12/1981 | Nashlund .................. 33/197 X |

Primary Examiner—Harry N. Haroian
Attorney, Agent, or Firm—Sperry, Zoda & Kane

[57] ABSTRACT

A device as disclosed to facilitate the placement of locks into doors including key-in-knob lock sets, mortise deadlocks as well as independent knobs and deadbolts. The device includes a body which is detachably securable with respect to a door edge in which it includes calibrations or gradations therealong in order to align the correct spacing normally independently measured by a locksmith. The body member defines an aperture along the portion adjacent to the edge of the door, which aperture is adapted to receive selectively a plate for guiding of boring in through the edge as well as to receive a plate for guiding of routing out the edge of the door about the bored out hole to provide a recess to receive the face of the locking mechanism. The pilot block for guiding of the boring is movable with respect to the plate placed into the aperture of the body. The body also is adapted to be secured to a member which extends adjacent over the front and rear face of the door to guide boring perpendicular to the door face for placement of other locking mechanisms including a knob or deadlocking mechanism. The rear face of the door is adapted to be abutted by an abutting block which prevents fracturing of the door when boring through the member extending over the front face is being completed.

13 Claims, 7 Drawing Figures

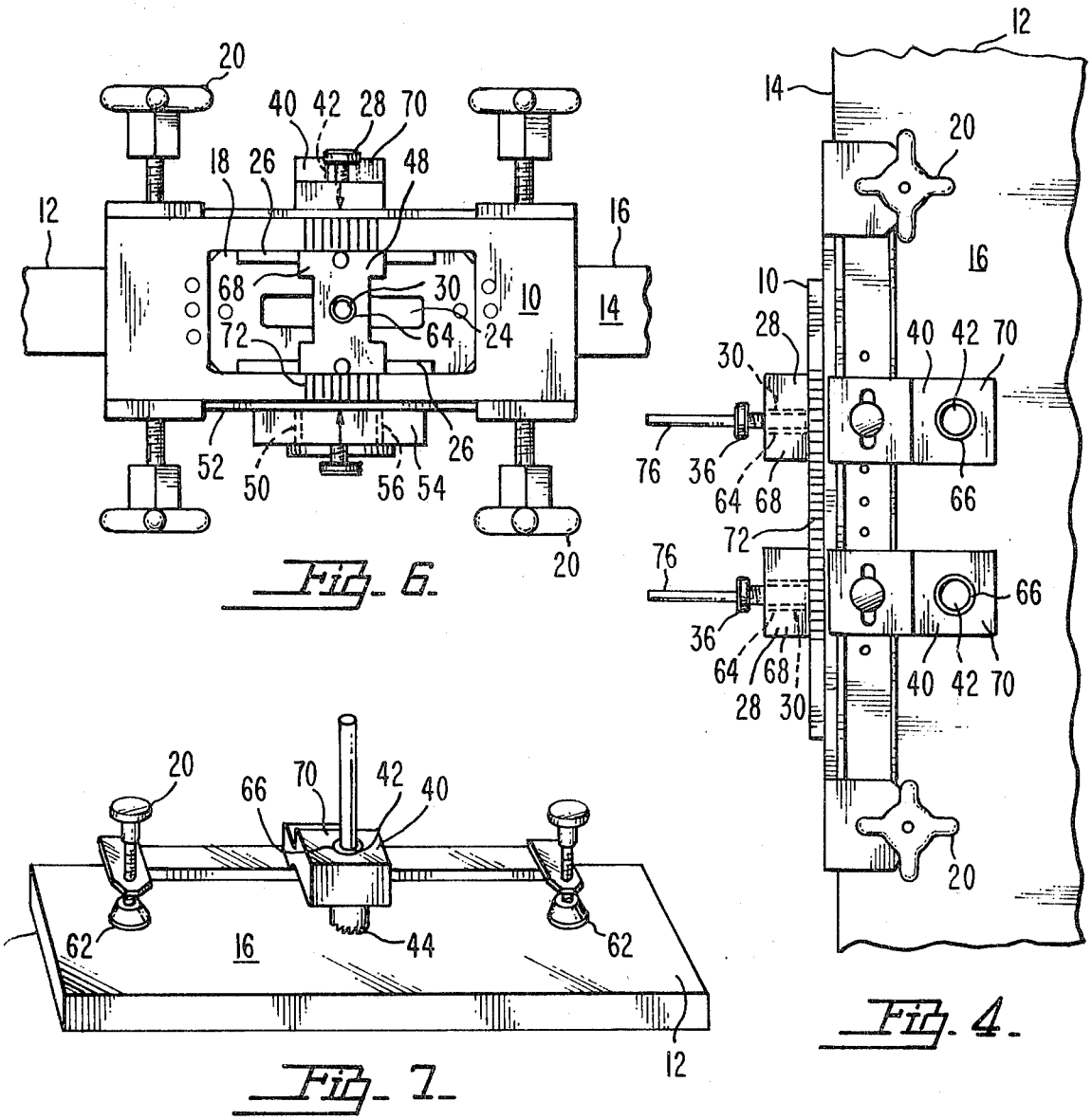
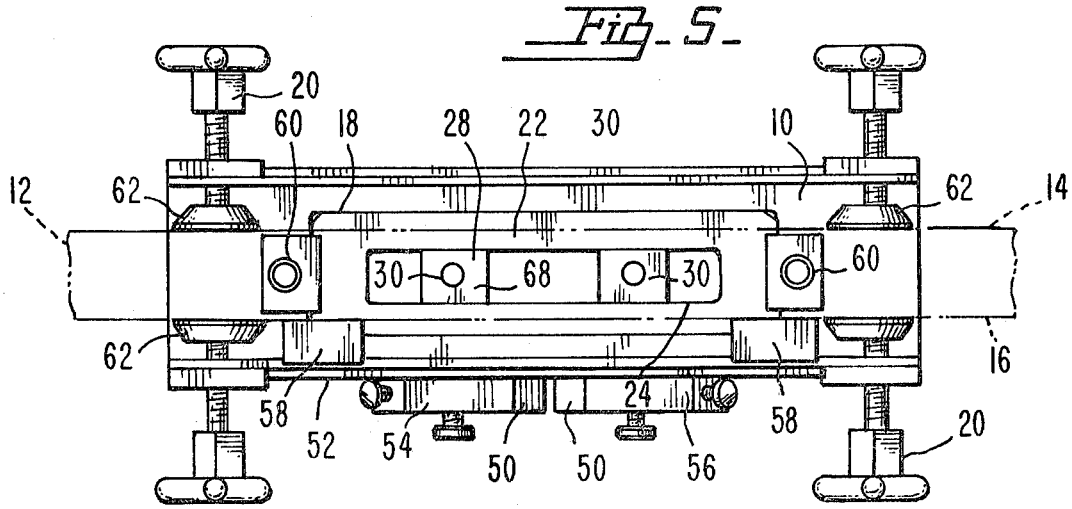

UNIVERSAL PROGRAMMABLE LOCK INSTALLATION DEVICE

BACKGROUND OF THE INVENTION

1. Field Of The Invention

The present invention deals with the field of devices usable for facilitating the cutting of holes in the edges of faces of doors for the placement of knobs, lock sets, deadbolts, mortise deadbolts and other types of locking mechanisms therein. Normally a locksmith will work by hand measuring the back sets and vertical distances between independent locking mechanisms or a single composite locking mechanism which is a costly and tedious operation. The present invention provides a novel means for pre-programming the entire set of measurements prior to attachment of the present device onto the door and in this manner greater facilitates accuracy and speed of performance in those modifications to a door necessary to adapt the door to receive such a desired locking mechanism.

2. Description Of The Prior Art

Numerous attempts have been made to create such boring and routing jigs. However none of them have proved to be as universal as the present member. Examples of such previous designs are shown in U.S. Pat. Nos. 4,306,823 on a Boring And Routing Jig For Cylindrical Door Knob Assemblies And The Like; 3,635,571 on a Boring Jig; 3,392,607 on a Boring And Routing Jig For Doors; 3,212,366 on a Multiple Location Boring Jig; 3,021,734 on a Boring Jig; 2,814,219 on a Woodworking Boring Jig; 2,679,771 on a Boring Jig For Doors; 2,679,174 on a Boring Jig; 2,268,930 on a Mortising Gauge; 1,919,900 on an Auger Guide; 1,432,485 on a Mortise Gauge; and 992,500 on a Mortising And Centering Device.

These designs illustrate many devices which are shown to be unduly complicated and unduly in need of maintenance requirements and as such the present invention has been designed as a more universal device.

SUMMARY OF THE INVENTION

The present invention provides a universal programmable lock installation device particularly for use on doors of wood or metal which includes a body member capable of being positioned extending around the edge of the door. The body member also includes elements extending inwardly therefrom along the front and rear door face. The body member defines an aperture therein adjacent to the door edge and providing access thereto.

A clamping means is movably mounted within the body member to selectively secure it with respect to the door at any desired location. A boring template is included which may be selectively positioned securely within the aperture. The boring template defines a bore slot therein to provide a window for boring therethrough into the door edge. The boring template also includes guide rails extending longitudinally therealong. These guide rails are adapted to be gripped movably by an edge boring alignment means such as a pilot block. The pilot block being movable with respect to the guide rail means is adapted to move longitudinally with respect to the body member by being movably secured with respect to the guide rail. The pilot block defines therein an edge boring guide hole which is adapted to receive the boring tool such as a drill member therethrough and to maintain alignment of this tool during boring such that the boring is perpendicular to the door edge and extends through the boring slot defined in the boring template as it is in position within the aperture of the body member. The edge boring alignment means also includes a first locking means which is adapted to selectively secure this pilot block with respect to the body member.

After the boring operation is completed, the boring template is removed from its position within the aperture and a routing template is placed within the aperture. The routing template also is selectively positionable within this aperture and defines therein a routing slot. The outer surface of the routing template is smooth and does not include guide rail means as does the edge boring alignment means and in this manner provides a smooth outer surface to facilitate routing of the door edge through the routing slot in an area of the door edge around the boring edge hole in the door to facilitate placement of a conventional lock face plate or other similar construction therein.

The lock installation device also includes a face boring alignment means movably secured with respect to one edge of the body member to allow vertical longitudinal movement of the face boring alignment means with respect to the body member. The face boring alignment means extends outwardly over the door face and defines a face boring guide hole means therein which is oriented perpendicularly with respect to the door face and is adapted to receive a boring tool extending therethrough. The boring tool thereby cuts a hole in the face of the door extending completely through the door into and through the rear face thereof to facilitate securement of the boring alignment means with respect to the body means a second locking means is adapted for fixed securement therebetween.

A face boring abutment means is also movably secured with respect to the body member but on the opposite vertical edge from the point of securement of the face boring alignment means with respect thereto. This face boring abutment means is vertically movable to be oriented in abutment with the rear face of the door directly opposite the point of the face boring alignment means in its securement to the front face. The face boring alignment means includes an abutment block means defining an abutment aperture therein slightly larger than the face hole bored through the door by the cutting means extending through the face boring alignment means. In this manner the block means by being in abutting engagement with respect to the opposite door face will surround the face hole extending through the rear face and thereby prevent splintering of the edge of the door face aperture on the opposite rear door face as the boring means cuts therethrough.

The universal programmable lock installation device of the present invention also includes a face spacer means secured to the inside surface of the body member to provide a degree of initial positioning of the body member from the door face for a preliminary rough positioning. The device may also include an edge spacer means selectively securable with respect to the inside surface of the body member to provide a variation distance of the body member from the door edge. This edge spacer means is preferably removable to vary the depth thereof and thereby vary the distance at which the lock installation device will be spaced from the door edge.

The clamping means of the present invention preferably includes a foot means which is also preferably at least two inches in diameter to prevent damaging or marring of any portion of the door during boring and routing thereof.

Preferably an edge bearing means is positioned within the edge boring guide hole means to facilitate rotation of a cutting means extending therethrough. It is also preferable that this edge bearing means be of hardened steel. Similarly a face bearing means should preferably be positioned within the face bearing guide hole means to facilitate rotation of a cutting means therethrough and to prevent wear in the guide hole means. It is also preferable that this face bearing means be of hardened steel.

The universal lock installation device of the present invention also preferably includes two edge pilot block members forming the edge boring alignment means which are capable of separate movement with respect to one another to facilitate boring of two separate door face holes. Preferably also the present invention includes measurement gradations marked vertically along the body member to facilitate placement of the edge boring alignment means and the face boring alignment means at the desired spacing with respect to one another.

It is an object of the present invention to provide a lock installation device being particularly usable on wood and metal-clad doors.

It is an object of the present invention to provide a lock installation device which is pre-programmable.

It is an object of the present invention to provide a programmable lock installation device which is universal in application and uses regardless of the one type of locking mechanism being installed of the various types now commonly utilized.

It is an object of the present invention to provide a universal programmable lock installation device which includes clamping means having feet thereon at least two inches in diameter to prevent marring of the door surface.

It is an object of the present invention to provide a universal programmable lock installation device which minimizes the time required for placement of locking or latching apparatus within a wood or metal-clad door.

It is an object of the present invention to provide a universal programmable lock installation device which is simple in construction and easily maintained.

It is an object of the present invention to provide a universal programmable lock installation device which greatly reduces the cost of placing lock sets and latching mechanisms in wood and metal-clad doors.

It is an object of the present invention to provide a universal programmable lock installation device which is capable of varying the distance between the body member and the door edge.

It is an object of the present invention to provide a universal programmable lock installation device including hardened steel bearings within the boring guide holes to extend the useful life thereof.

It is an object of the present invention to provide a universal programmable lock installation device including measurement gradations marked vertically along the body member to facilitate setting of the pre-programmed dimensions between the face and edge boring tools.

It is an object of the present invention to provide a universal programmable lock installation device which is completely reversible in positioning orientation with respect to a door.

It is an object of the present invention to provide a universal programmable lock installation device which prevents splintering of a door when boring therethrough.

It is an object of the present invention to provide a universal programmable lock installation device which has fully adjustable front and sides for different centers as manufactured by the different lock companies.

It is an object of the present invention to provide a universal programmable lock installation device which allows the holes to be drilled into the edge of the door and routed out for face plates of latches on bolts without moving the fixture secured with respect to the door.

It is an object of the present invention to provide a universal programmable lock installation device which can install either Mortise lock, Mortise dead bolt, key-in-knob or tubular dead bolt or combination of key-in-knob and tubular dead bolt.

It is an object of the present invention to provide a universal programmable lock installation device which can accommodate a 2 ⅜" thick door.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 4 is a side plan view of the embodiment shown in FIG. 3;

FIG. 5 is a rear view of an embodiment of the universal programmable lock installation device of the present invention showing the boring template and pilot blocks in place and showing the door in dotted outline;

FIG. 6 illustrates a front plan view of an alternative embodiment of the universal programmable lock installation device showing a shortened body member with a single pilot block and single face boring alignment means and single face boring abutment means thereon; and FIG. 7 is a side perspective view of the face boring alignment means of the alternative embodiment shown in FIG. 6.

DETAILED DESCRIPTION OF THE PREFERRED EMBODIMENT

Figure 1:
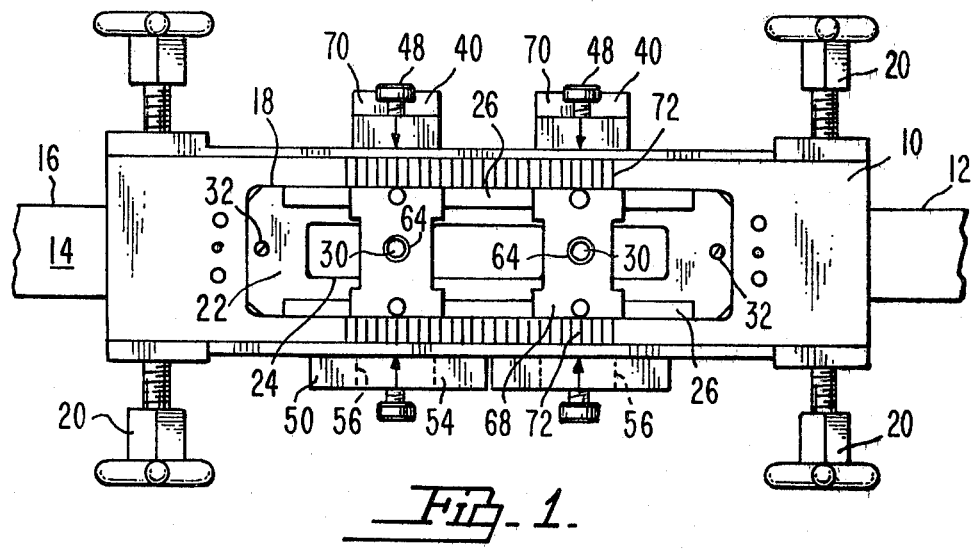
FIG. 1 is a front plan view of an embodiment of a universal programmable lock installation device of the present invention showing the routing template and pilot blocks in place.
Figure 2:
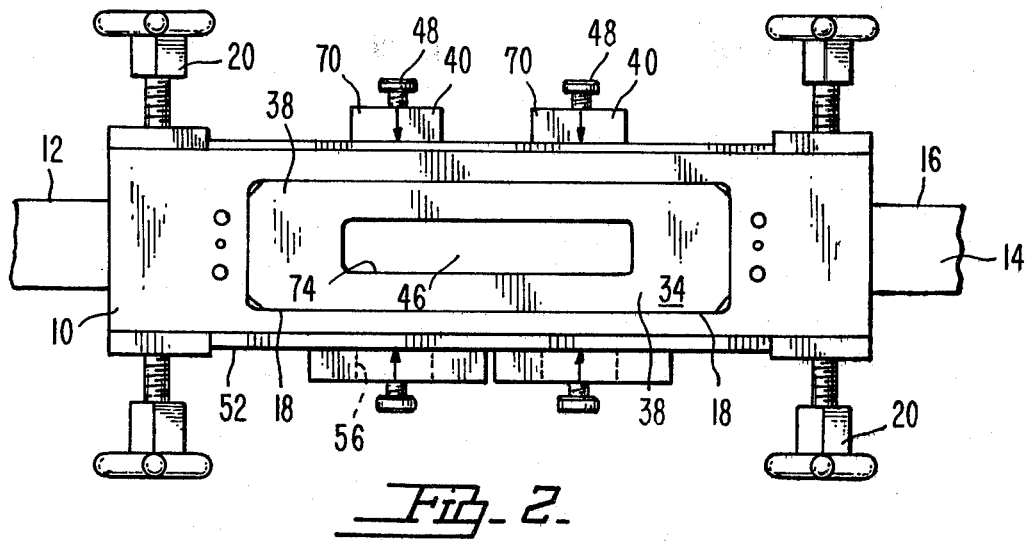
FIG. 2 is a front plan view of an embodiment of the universal programmable lock installation device of the present invention showing the routing template in place.
Figure 3:
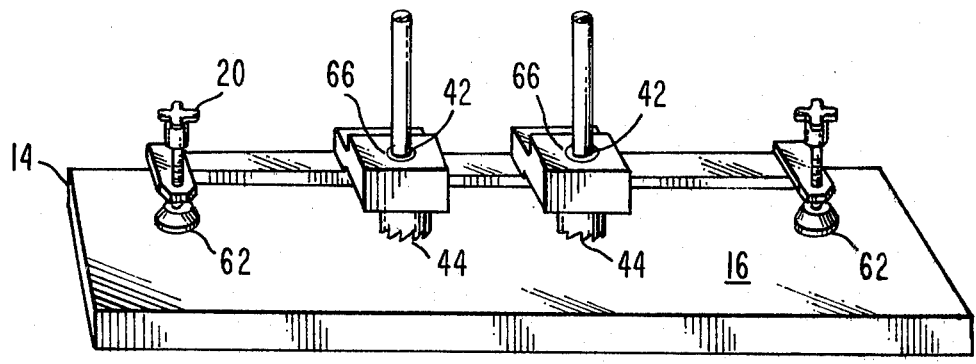
FIG. 3 is a side view of an embodiment of the universal programmable lock installation device of the present invention showing the front door face with the face boring alignment means abutting thereagainst.

The present invention provides a universal lock installation device having a body member 10 adapted to be detachably secured about the edge 14 of a conventional door 12. The door may be of a wooden construction or may have metal facing thereon. The body member is longitudinal and has a general U-shape to extend about the edge 14 along the forward and rearward faces 16. The body member is secured to the door by a clamping means 20.

Body member 10 includes an aperture 18 defined therein adjacent to the door edge 14. This aperture 18 is adapted to receive therein a boring template 22 which defines a boring slot 24 therein to thereby provide a window through which boring of the door can be performed for facilitating placement of a locking or latching mechanism therein.

An edge boring alignment means 28 such as a pilot block member is movably positioned longitudinally along the body member 10 in the vertical direction. Preferably edge boring alignment means 28 is secured with respect to guide rail means 26 which extend vertically along each opposite edge of the boring template 22 in such a fashion as to allow such vertical movement of the edge boring alignment means and facilitate boring of the door edge. The edge boring alignment means 28 includes an edge boring guide hole 30 defined therein which is adapted to receive a boring tool 76 which will be aligned by the edge boring guide hole 30 at each fixed location thereof. After one boring is performed the edge boring guide hole 30 can be moved upwardly and a new boring hole can be made until the entire area preferably of the boring slot 24 is so bored.

A securement means 32 is adapted to secure the boring template into the aperture but also is operable to be loosened and thereby allow removal of the boring template 22 from the aperture 18. This is normally done after the boring is completed to allow the placement of a routing template 34 therein.

Routing template 34 is adapted to be secured by securement means 32 into the aperture 18 in a similar fashion as was the boring template 22 during the boring operation. Routing template 34 defines a routing slot 74 therein which is adapted to facilitate the routing of an area around the bored out opening to facilitate placement of a locking mechanism and in particular the face plate of the locking mechanism therein. The upper surface of the routing template 34 is smooth and does not include members such as guide rail means 26 and in this manner provides a smooth surface 38 to facilitate the routing operation.

A first locking means 36 may be included to fixedly secure the body member 10 with respect to the edge boring alignment means 28. In this manner each bored hole as the boring is performed throughout the boring slot 24 will be carefully aligned and the first locking means will be adapted to be loosened and re-locked at each boring location.

A face boring alignment means 40 is adapted to extend over the door face 16 and in particular over the front of the door face and defines therein a face boring guide hole means 42 adapted to receive a face boring tool therethrough to make a face hole 44 for accepting locking configurations such as a door knob structure. This face hole 44 will be aligned with respect to the edge hole 46 caused by boring of the door edge 14 in such a fashion as to define an internal chamber for holding the locking or latching mechanism.

A second locking means 48 is adapted to selectively secure the face boring alignment means 40 with respect to the door 12 and particularly with respect to the body member 10 at the predetermined and pre-programmed position to carefully align and space the face hole 44 with respect to the edge hole 46.

The face hole 44 when being bored will normally extend completely through the door and to prevent splintering of the rear door face a face boring abutment means 50 will preferably be secured with respect to the opposite vertical edge 52 of body member 10 in such a fashion as to extend over the rear face of the door. The face boring abutment means preferably will include an abutment block means 54 defining an abutment aperture 56 therein which is slightly larger than the hole being made by the boring tool which is making the face hole 44. The abutment block means 54 is preferably removable to vary the diameter of the abutment aperture 56 defined therein and in this manner allow for having an abutment aperture 56 always being slightly larger than the particularly chosen boring tool diameter which will determine the diameter of the face hole 44.

A face spacer means 58 as shown in FIG. 5 will provide an initial lateral positioning of the body member 10 with respect to the door. The initial orientation will facilitate the clamping of the clamping means 20 in such a fashion that the body member 10 is accurately positioned with respect to the door edge. Due to different thicknesses of doors the face spacer means 58 will preferably be removable and a series of at least two such spacer means will be available for detachable securement with respect to the body member 10 as determined by the predetermined number of conventional door thicknesses.

Similarly an edge spacer means 60 such as a ring-like member as also shown in FIG. 5 will provide some variation in the spacing of the body member 10 with respect to the edge of the door to provide some variation in the distance between the center of the face hole 44 and the door edge. Similarly the edge spacer means 60 will preferably be detachable to allow for several standard sizes for the several standard insets conventionally available in locking and latching configurations.

To minimize damage to the door member it is preferable that the clamping means 60 include foot means 62 which are of substantial diameter such as two inches in diameter. In this manner the pressure of securement of body member 10 with respect to the door 12 will be spread over a larger area and will thereby minimize marring or scratching of the door surface.

The face boring guide hole means 42 and the edge boring guide hole means 30 will preferably include a face bearing means 66 and an edge bearing means 64, respectively. It is preferable that each of these bearing means be of a hardened material to extend the useful life thereof and a particularly hardened steel is preferable.

The preferred chosen configuration of the edge boring alignment means 28 is an edge pilot block member 60 which is easily movable and allows securement of a bearing means quite easily therein. Similarly it is preferable that the face boring alignment means 40 be of the configuration of a face pilot block member 70 to facilitate the extended life of an aperture therein and to facilitate adjustment thereof with respect to the body member 10. Also to more accurately control the vertical movement to vary the respective positions of the edge and face boring tool 76 it is preferable that measurements gradations 72 be included extending vertically along the outer surface of the body member 10 in such a fashion as to provide conventional measurements for preprogramming the universal programmable lock installation device of the present invention to the particular lock inset or mortise depth or other such standard locking or latching measurements. Most of these measurements tend to be quite standard however several actual standards are used and it is quite easy with the present invention using these measurements gradations 72 to pre-set the body member 10 to the particular manufacturer's specifications prior to placement and thereby facilitate and speed installation of the locking or latching mechanism.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A universal programmable lock installation device, for use on doors, comprising:
   (a) a body member positionable extending around the edge of the door and inwardly therefrom along each door face, said body member defining an aperture therein adjacent the door edge;
   (b) a clamping means movably mounted within said body member to selectively secure said body member with respect to a door edge;
   (c) a boring template selectively positionably mounted within said aperture and defining a boring slot therein, said boring template including guide rail means extending longitudinally along said boring slot;
   (d) an edge boring alignment means movably secured with respect to said guide rail means to move longitudinally along said boring slot, said edge boring alignment means including edge boring guide hole means adapted to receive a boring tool therethrough for alignment through said boring slot of said boring template to bore out a section of a door edge to a desired depth;
   (e) a first locking means adapted to fixedly secure said edge boring alignment means with respect to said body member;
   (f) a securement means for selectively retaining said boring template within said aperture of said body member;
   (g) a routing template selectively positionable within said aperture of said body member and adapted to be retained therein by said securement means, said routing template defining a routing slot therein to allow routing of the door edge to facilitate placement of a conventional lock face plate therein, the outer surface of said routing template providing a smooth surface to facilitate routing;
   (h) a face boring alignment means movably secured with respect to one of the vertical edges of said body member to allow vertical longitudinal movement therealong, said face boring alignment means extending out over the door face and defining a face boring guide hole means oriented perpendicularly with respect to the door face and adapted to receive a boring tool extending therethrough to cut a face hole extending completely through the door;
   (i) a second locking means adapted to fixedly secure said face boring alignment means with respect to said body member; and
   (j) a face boring abutment means movably secured with respect to the opposite vertical edge of said body member from said face boring alignment means and being vertically movable along the opposite vertical edge, said face boring abutment means extending out over the opposite side door face and defining an abutment block means defining an abutment aperture slightly larger than the face hole bored through the door by the cutting means extending through said face boring alignment means, said block means being in abutting engagement with respect to the opposite door face surrounding the face hole to prevent splintering of the opposite door face upon boring of the face hole.

2. The universal programmable lock installation device as defined in claim 1 further including a face spacer means secured to the inside surface of said body member to provide an initial positioning of said body member from the door face.

3. The universal programmable lock installation device as defined in claim 1 further including removable edge spacer means secured to the inside surface of said body member to provide an initial positioning of said body member from the door edge.

4. The universal programmable lock installation device as defined in claim 1 wherein said clamping means includes a foot means in contact with the door face.

5. The universal programmable lock installation device as defined in claim 2 wherein said foot means is at least two inches in diameter at the point of abutment with respect to the door face.

6. The universal programmable lock installation device as defined in claim 1 further comprising edge bearing means positioned within said edge boring guide hole means to facilitate rotation of a cutting means extending therethrough.

7. The universal programmable lock installation device as defined in claim 6 wherein said edge bearing means are of hardened steel.

8. The universal programmable lock installation device as defined in claim 1 further comprising a face bearing means positioned within said face boring guide hole means to facilitate rotation of a cutting means therethrough.

9. The universal programmable lock installation device as defined in claim 8 wherein said edge bearing means are of hardened steel.

10. The universal programmable lock installation device as defined in claim 1 wherein said edge boring alignment means comprises two edge pilot block members each capable of separate movement with respect to one another to facilitate boring of two separate door edge borings.

11. The universal programmable lock installation device as defined in claim 1 wherein said face boring alignment means comprises two face pilot block members each capable of separate movement with respect to one another to facilitate boring of two separate door face holes.

12. The universal programmable lock installation device as defined in claim 1 further including measurement gradation marked vertically along said body member to facilitate placement of said edge boring alignment means and said face boring alignment means.

13. A universal programmable lock installation device, for use on doors, comprising:
   (a) a body member positionable extending around the edge of the door and inwardly therefrom along each door face, said body member defining an aperture therein adjacent the door edge;
   (b) a clamping means movably mounted within said body member to selectively secure said body member with respect to a door edge, said clamping means including foot means in abutting contact with respect to the door face along the surface thereof at least two inches in diameter;

(c) a boring template selectively positionably mounted within said aperture and defining a boring slot therein, said boring template including guide rail means extending longitudinally along said boring slot;

(d) an edge boring alignment means movably secured with respect to said guide rail means to move longitudinally along said boring slot, said edge boring alignment means including two edge pilot block members each capable of separate movement with respect to one another to facilitate boring of two separate door edge borings, said edge boring alignment means including an edge boring guide hole means adapted to receive a boring tool therethrough for alignment through said boring slot of said boring template to bore out a section of a door edge to a desired depth, said edge boring alignment means further including an edge bearing means positioned within said edge boring guide hole means to facilitate rotation of a cutting means extending therethrough, said edge bearing means being of hardened steel;

(e) a first locking means adapted to fixedly secure said edge boring alignment means with respect to said body member;

(f) a securement means for selectively retaining said boring template within said aperture of said body member;

(g) a routing template selectively positionable within said aperture of said body member and adapted to be retained therein by said securement means, said routing template defining a routing slot therein to allow routing of the door edge to facilitate placement of a conventional lock face plate therein, the outer surface of said routing template providing a smooth surface to facilitate routing;

(h) a face boring alignment means movably secured with respect to one of the vertical edges of said body member to allow vertical longitudinal movement therealong, said face boring alignment means comprising two face pilot block members each capable of separate movement with respect to one another to facilitate boring of two separate door face holes, said face boring alignment means extending out over the door face and defining a face boring guide hole means oriented perpendicularly with respect to the door face and adapted to receive a boring tool extending therethrough to cut a face hole extending completely through the door, said face boring alignment means further including a face boring means positioned within said face boring guide hole means to facilitate rotation of a cutting means therethrough, said face bearing means being of hardened steel;

(i) a second locking means adapted to fixedly secure said face boring alignment means with respect to said body member;

(j) a face boring abutment means movably secured with respect to the opposite vertical edge of said body member from said face boring alignment means and being vertically movable along the opposite vertical edge, said face boring abutment means extending out over the opposite side door face and defining an abutment block means defining an abutment aperture slightly larger than the face hole bored through the door by the cutting means extending through said face boring alignment means, said block means being in abutting engagement with respect to the opposite door face surrounding the face hole to prevent splintering of the opposite door face upon boring of the face hole;

(k) a face spacer means secured to the inside surface of said body member to provide an initial positioning of said body member from the door face;

(l) a removable edge spacer means secured to the inside surface of said body member to provide an initial positioning of said body member from the door edge; and (m) measurement gradations marked vertically along said body member to facilitate placement of said edge boring alignment means and said face boring alignment means with respect to said body member.

* * * * *